US005788452A

United States Patent [19]

Brouwer et al.

[11] Patent Number: 5,788,452

[45] Date of Patent: Aug. 4, 1998

[54] FORKLIFT VEHICLE

[75] Inventors: Gerardus J. Brouwer, 23324 Woodbine Ave., Keswick, Ontario, Canada, L4P 3E9; Don Milwain, Newmarket; Ralph Ratsep, Pefferlaw, both of Canada

[73] Assignee: Gerardus J. Brouwer, Keswick, Canada

[21] Appl. No.: 891,791

[22] Filed: Jul. 14, 1997

[51] Int. Cl.[6] .......... B60P 1/64

[52] U.S. Cl. .......... 414/631; 414/635; 414/914; 187/222; 280/656; 280/756

[58] Field of Search .......... 280/656, 43.23, 280/405.01, 756; 180/282, 24.02; 414/629, 631, 635, 673, 632, 634, 392, 347, 636, 467, 914; 187/222

[56] References Cited

U.S. PATENT DOCUMENTS

| | | | |
|---|---|---|---|
| 2,320,601 | 6/1943 | Howell | 414/631 |
| 3,239,274 | 3/1966 | Weiss | 280/656 X |
| 3,565,273 | 2/1971 | Hahn | 414/631 |
| 4,580,805 | 4/1986 | Bertolini | 280/656 X |
| 5,346,233 | 9/1994 | Moser | 180/24.02 X |
| 5,409,346 | 4/1995 | Grether | 414/673 |
| 5,560,444 | 10/1996 | Tiedge | 280/656 X |

FOREIGN PATENT DOCUMENTS

| | | | |
|---|---|---|---|
| 751269 | 6/1956 | United Kingdom | 414/635 |
| WO 82/01363 | 4/1982 | WIPO | 414/629 |

*Primary Examiner*—Frank E. Werner
*Attorney, Agent, or Firm*—Bereskin & Parr

[57] ABSTRACT

A forklift vehicle having front wheels mounted on retractible horizontally extending legs which are normally locked in position, by cylinder operated locking pins, to slide plates on the rear frame of the vehicle. To collapse the vehicle, the fork carriage is rolled forwardly on the front legs; locking pins are hydraulically extended from the fork carriage into the legs while the rear locking pins are hydraulically retracted, and then the mast carriage is retracted retracting the front legs with it. The procedure is reversed to extend the front legs. An operator protective cage and seat extends rearwardly of the rear vehicle frame and can be collapsed upwardly and forwardly, further shortening the vehicle length.

13 Claims, 15 Drawing Sheets

FIG. 9.
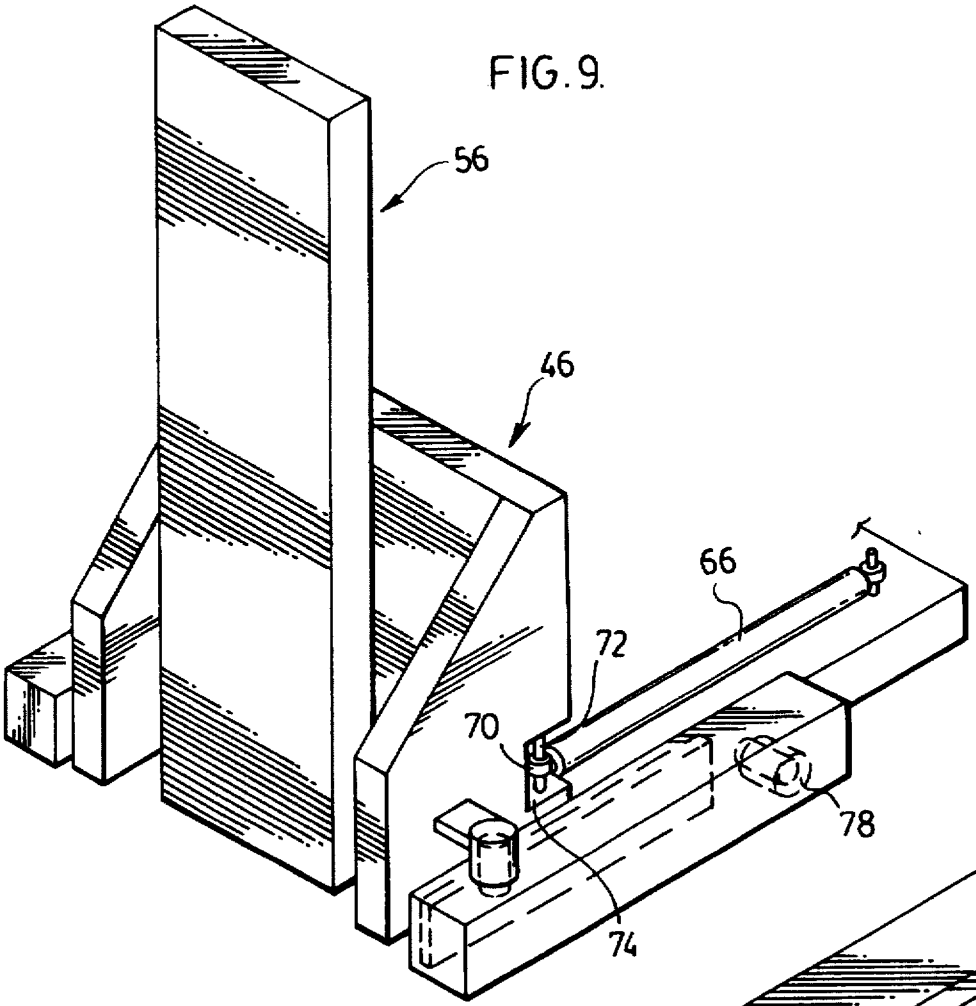
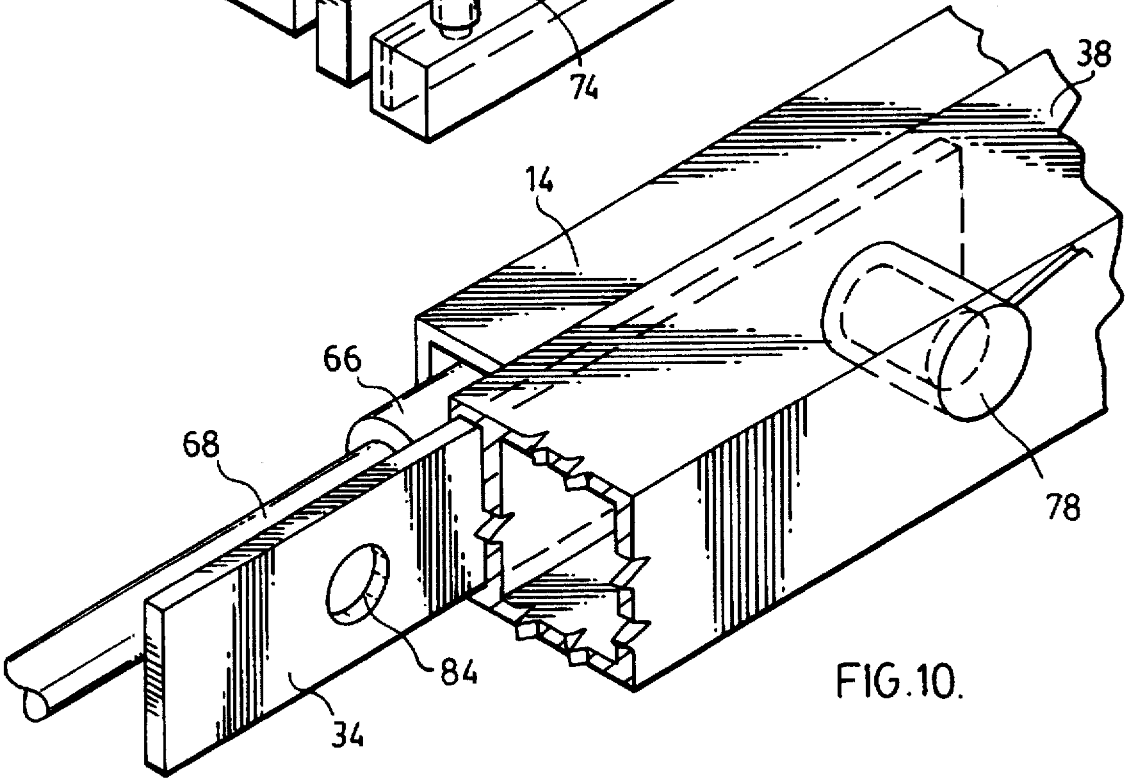
FIG. 10.

FORKLIFT VEHICLE

FIELD OF THE INVENTION

This invention relates to an improved forklift vehicle which can be collapsed from its operating length to a shorter length in a simple manner, for transport at the rear end of another vehicle.

BACKGROUND OF THE INVENTION

Vehicles such as forklift vehicles must often be carried from one location to another. It is common to do so by carrying the forklift vehicle on the rear end of another vehicle, such as a tractor trailer. However since the forklift vehicle then projects rearwardly from the tractor trailer, the combined length of the two vehicles can be unduly long.

In addition the leverage on the rear axle of the tractor trailer, created by the overhanging forklift vehicle, can be unacceptably high. For this reason it is known to have portions of a forklift vehicle which are retractable, so that the vehicle will occupy less length, or will fit more readily on a trailer which has its wheels and axle at its extreme back (so that there is no rearward overhang of the trailer platform).

For example, U.S. Pat. No. 4,061,237 issued Dec. 6, 1977 shows a forklift vehicle in which the front wheel portion of the vehicle can be retracted to a position such that the front to rear dimension of the vehicle is shortened.

U.S. Pat. No. 5,174,415 issued Dec. 29, 1992 shows another forklift vehicle in which the front wheels and their support arms can be swung upwardly, again to reduce the front to rear length of the vehicle.

U.S. Pat. No. 3,799,379 issued Mar. 26, 1974 shows yet another forklift vehicle in which the front wheels and their support arms are retractable to reduce the overall length of the vehicle.

U.S. Pat. No. 3,908,849 issued Sep. 30, 1975 shows a form of forklift vehicle which is collapsible to a tripod arrangement, again to reduce the overall length of the vehicle.

The forklift vehicles shown in the above mentioned patents suffer from various difficulties. One of these difficulties is that the vehicles shown tend to be complex or heavy or do not collapse sufficiently, that the overall length of the vehicles remains relatively substantial.

SUMMARY OF THE INVENTION

Accordingly, it is an object of the present invention in one of its aspects to provide a forklift vehicle comprising:

(a) a frame having a pair of sides, (b) a pair of leg support members extending forwardly one from each side of said frame, (c) a pair of legs, one mounted on each leg support member for movement forwardly and rearwardly on said leg support member, (d) a first pair of locking members, one mounted on one of each of said legs and said leg support members and operable between a locked position, in which each leg is locked to its support member, and an unlocked position in which each leg is free to move forwardly and rearwardly on its support member, (e) a mast carriage moveable forwardly and rearwardly on said legs, (f) an actuator for moving said mast carriage forwardly and rearwardly on said legs, (g) and a locking mechanism for locking said mast carriage to said legs when said mast carriage is in a forward position on said legs, so that said actuator can be operated to retract both said mast carriage and said legs, thereby shortening the length of said forklift vehicle.

In another aspect the invention provides a forklift vehicle having a frame having a rear end, and an operator protective cage mounted on said frame, said cage having a front fixed portion and a rear collapsible portion, an operator seat mounted on said rear collapsible portion, said rear collapsible portion being moveable between an operating position in which said seat is substantially horizontal and said collapsible portion extends rearwardly of said frame, and a collapsed position in which said seat is substantially vertical and said collapsible portion is moved upwardly and forwardly from said operating position.

Further objects and advantages of the invention will appear from the following description, taken together with the accompanying drawings.

BRIEF DESCRIPTION OF THE DRAWINGS

In the drawings:

FIG. 9 is a perspective view similar to that of FIG. 6 but showing the components in fully retracted or collapsed condition;

FIG. 10 is a perspective view of slide components of the FIG. 1 vehicle;

DETAILED DESCRIPTION OF PREFERRED EMBODIMENT

Figure 1A:
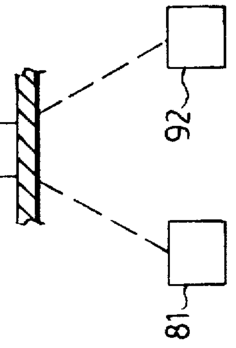
FIG. 1A is a diagrammatic view of a control arrangement for part of the FIG. 1 vehicle.
Figure 1:
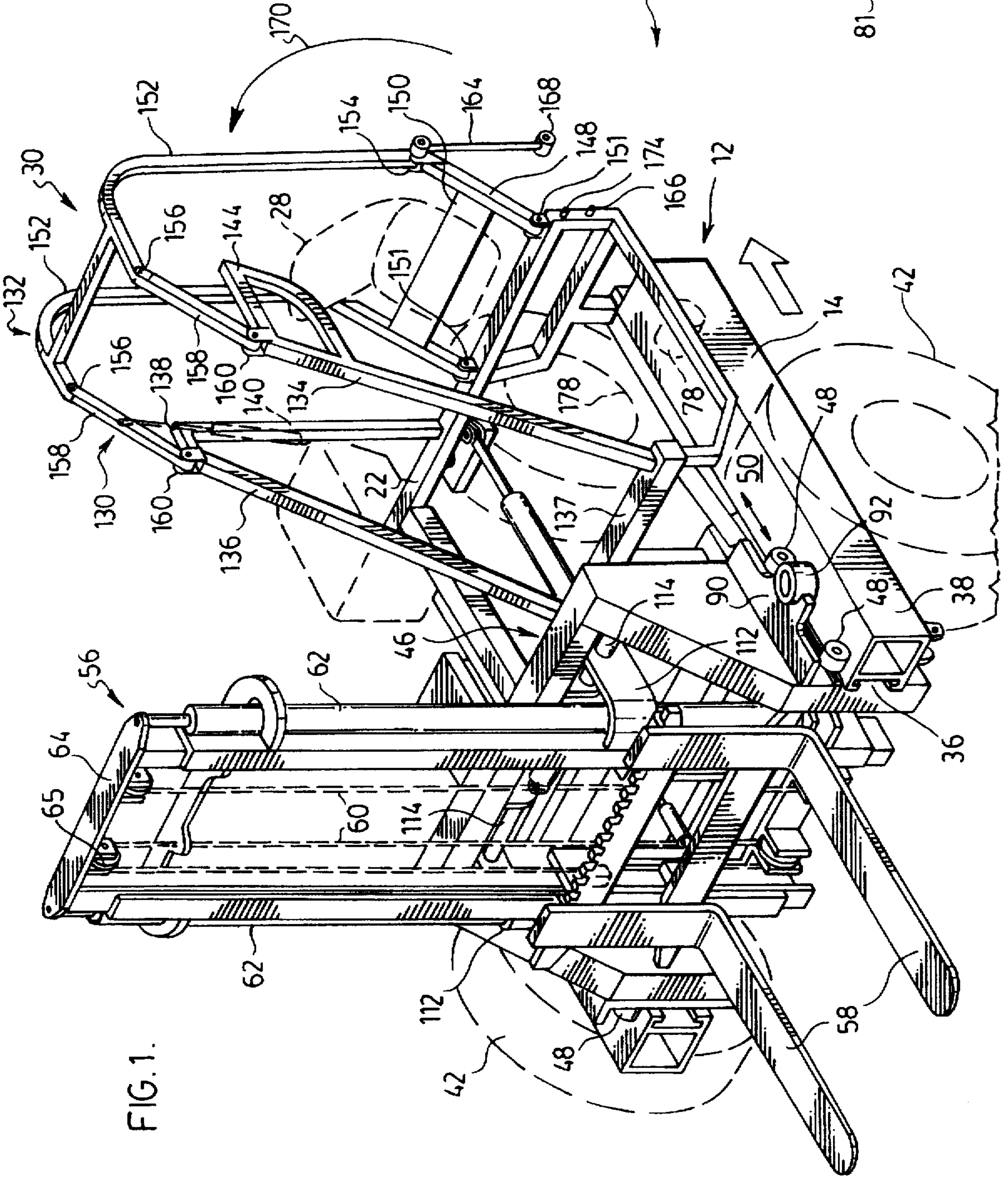
FIG. 1 is a perspective view of a forklift vehicle according to the invention, from the front and one side, showing a part of the vehicle in partially collapsed condition.
Figure 2:
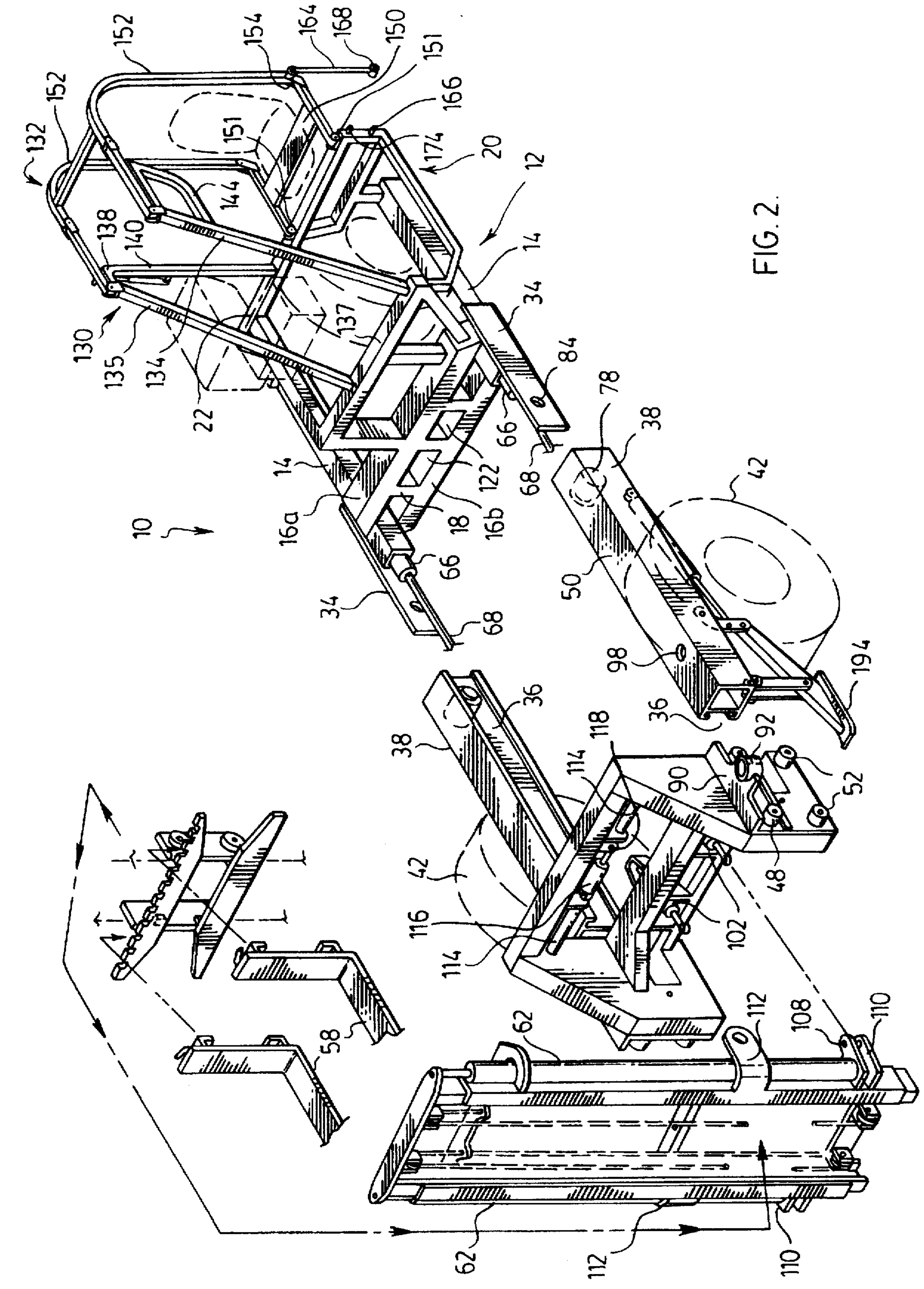
FIG. 2 is a perspective view from the front of one side showing major components of the forklift vehicle of FIG. 1 in exploded relationship.

Reference is first made to FIGS. 1 and 2, which show major components of a forklift vehicle 10 according to the invention. As shown, the vehicle 10 includes (FIG. 2) a frame 12, which comprises a pair of side frame members 14, of square metal tubing, joined adjacent their fronts by upper and lower cross members 16*a*, 16*b* which themselves are joined by vertical plates 18 for reinforcement purposes. The side frame members 14 are also joined by a metal subframe 20 (including a rear cross member 22 which joins both side frame members 14). The subframe 20 supports a steering wheel 24 (FIGS. 3 and 4), control levers 26, an operator seat 28, an operator protective cage 30, a drive motor 31, and the conventional hydraulics, fuel tanks and other conventional components (not shown) which are standard in forklift vehicles.

Figure 15:
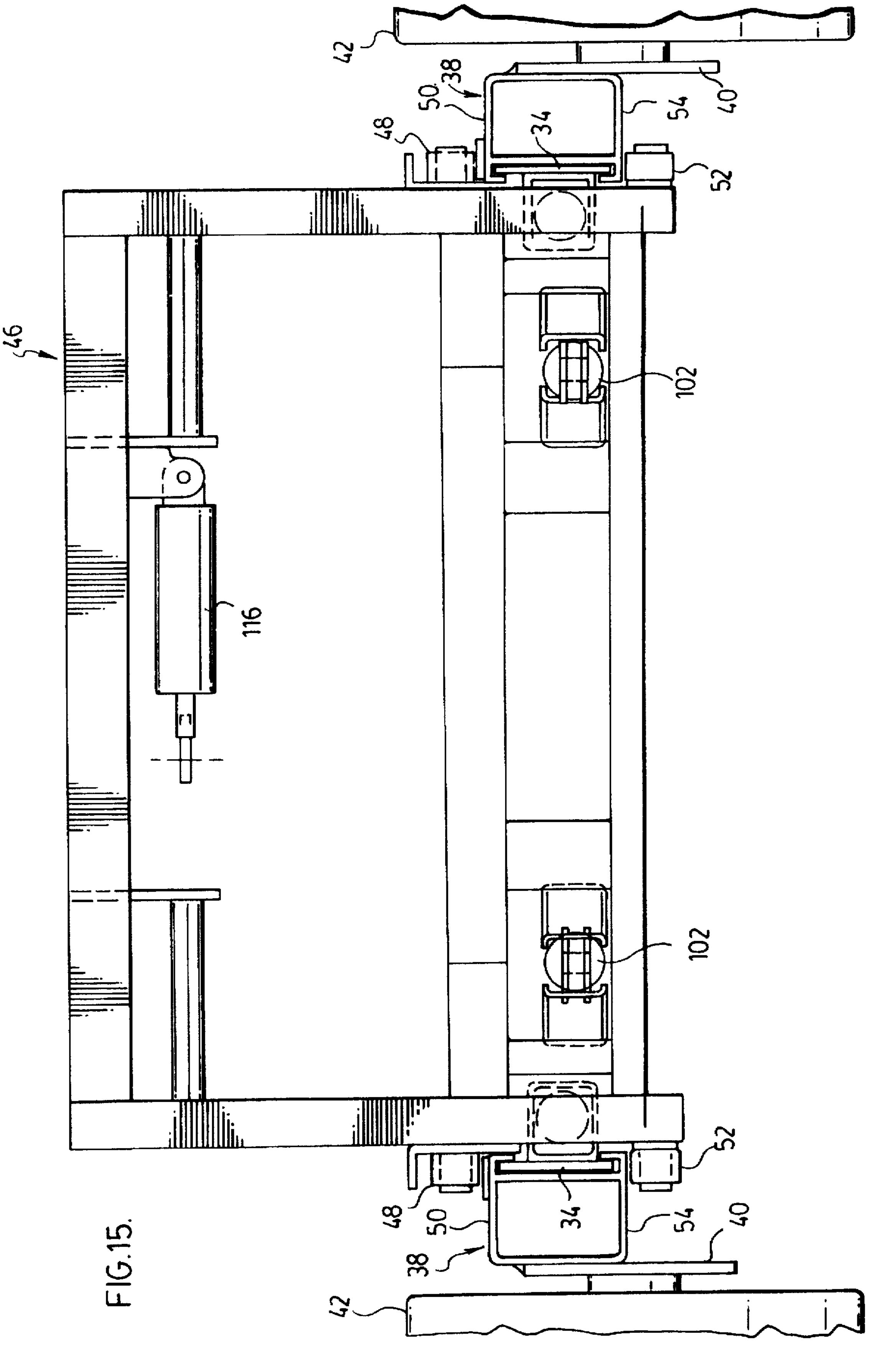
FIG. 15 is a front view showing mast carriage details for the FIG. 1 forklift.

Extending forwardly from the frame side members 14 are a pair of front leg slide plates 34 (FIG. 2). The slide plates 34 are welded to the frame side members 14 and each extends into a pair of opposed channels 36 in one of a pair of front legs 38. The front legs 38 are, as shown, each typically formed as a square box section member, except for the channels 36. Each front leg has, at its outer side and adjacent its front end, a downwardly extending plate 40 (FIG. 15) which supports a front wheel 42. The front legs 38 are free to slide forwardly and rearwardly on slide plates 34 when required to do so, as will be explained shortly.

A fork mast carriage 46 is supported on the front legs 38 by a pair of upper rollers 48 which ride on the flat upper surface 50 of the front legs 38, and by a pair of lower rollers 52 which ride on the flat lower surface 54 of the legs 38. The mast carriage 46 carries a mast 56 which in turn carries a set of forks 58 supported by chains 60. The forks 58 are driven upwardly and downwardly by a pair of conventional fork cylinders 62, one at each side of the mast, and which raise and lower a carrier plate 64 at the top of the mast and to which chain idlers 65 are pivotally connected.

Figure 6:
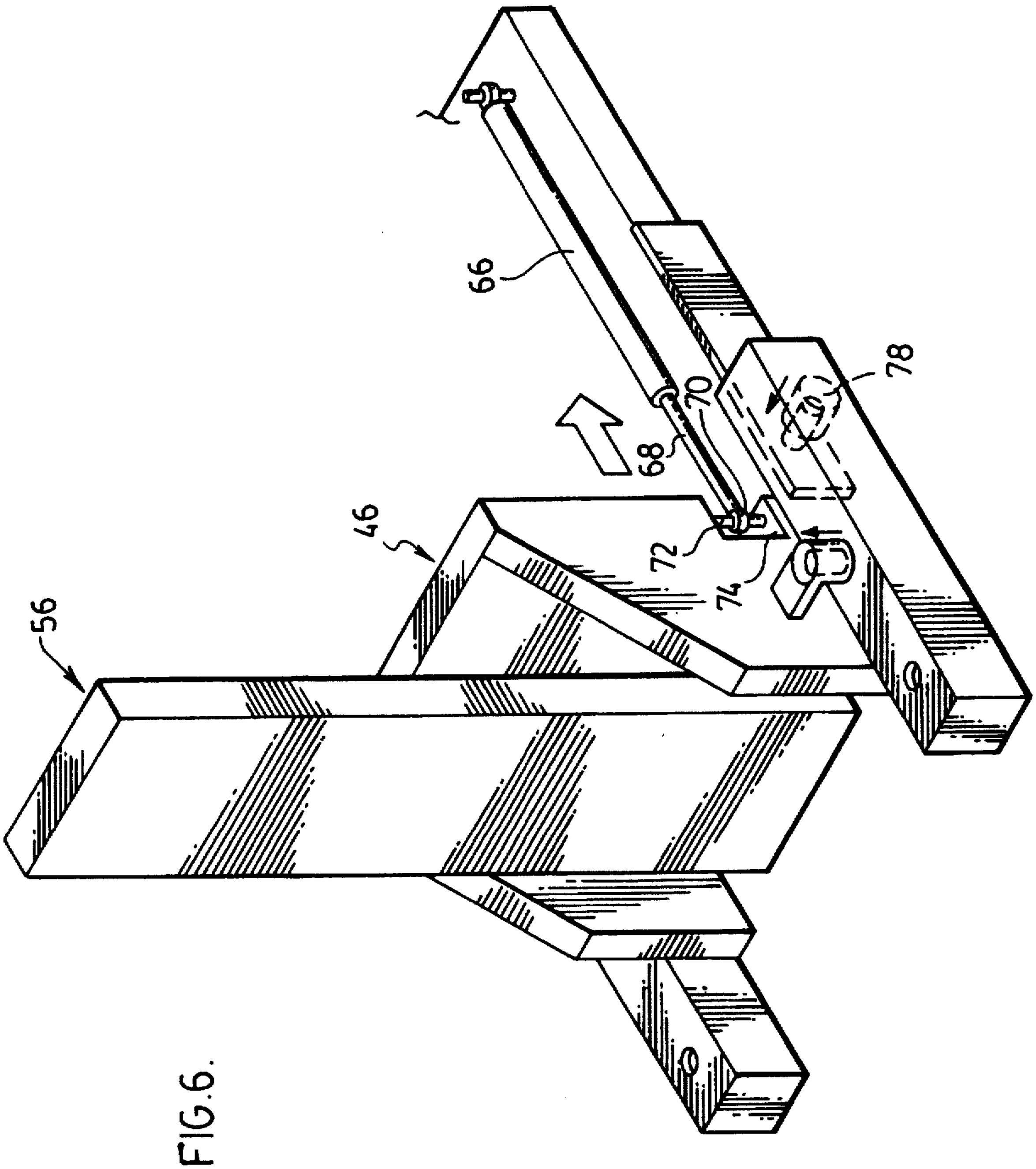
FIG. 6 is a simplified diagrammatic perspective view of the fork mast, mast carriage and side components of the forklift vehicle of FIG. 1, showing their operating relationships (partly collapsed)
Figure 8:
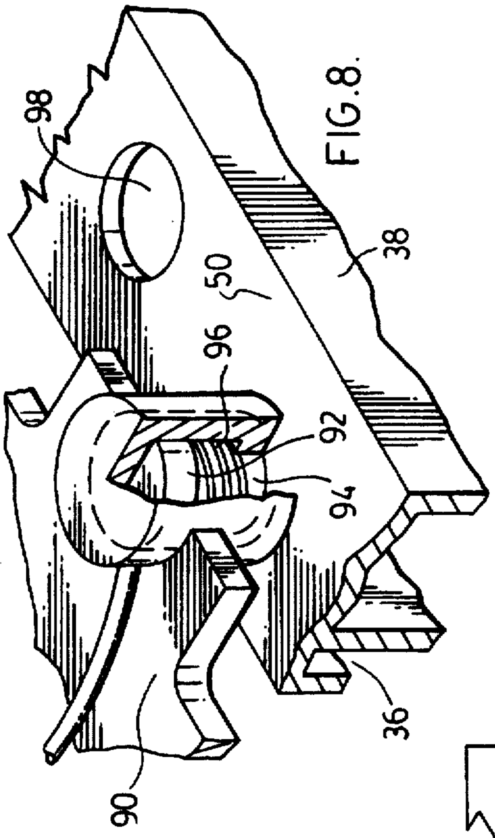
FIG. 8 is a partly broken away perspective view showing a pin locking mechanism for the vehicle of FIG. 1.
Figure 7:
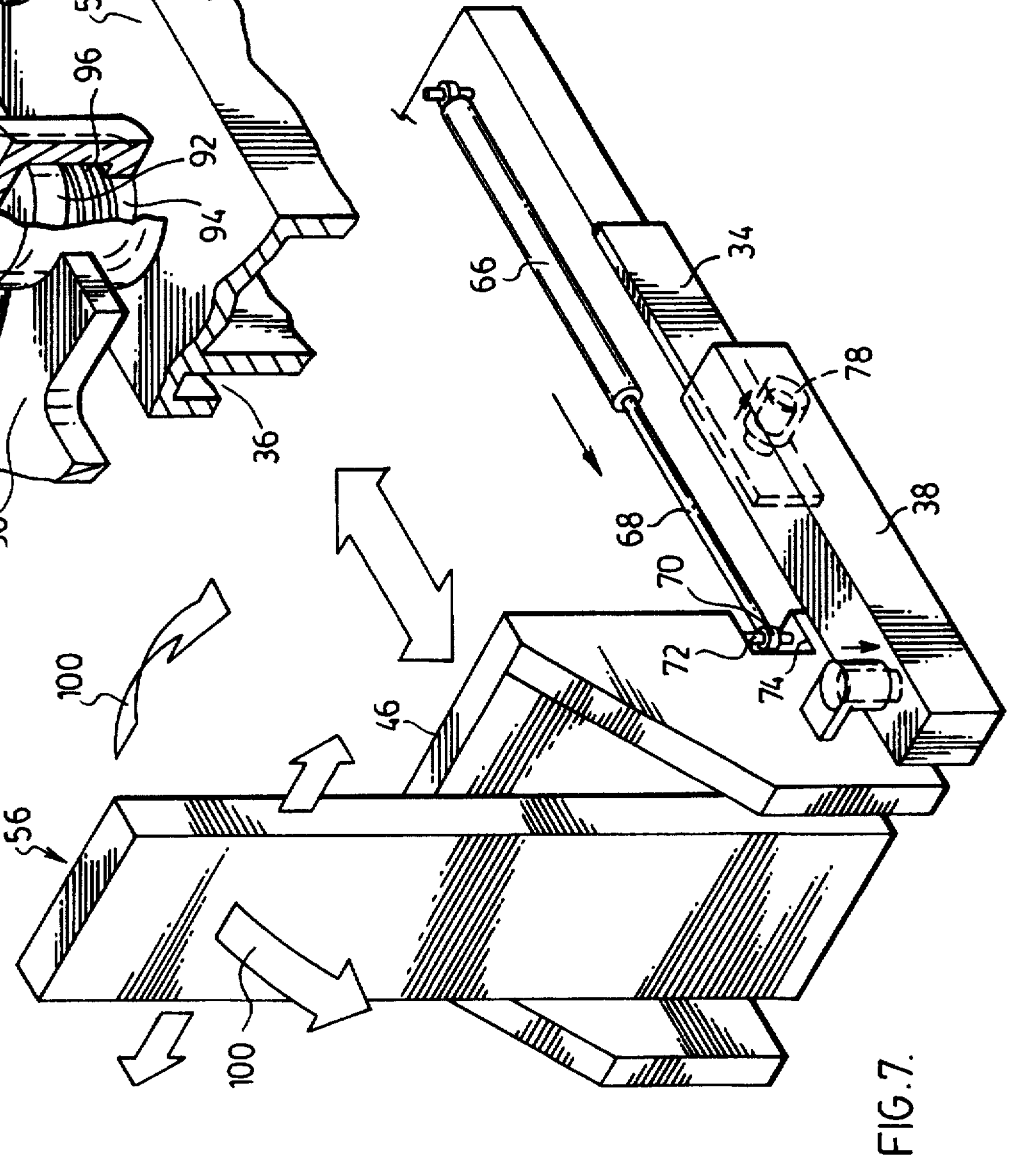
FIG. 7 is a perspective view similar to that of FIG. 6 but showing the components in a different operating position (fully extended)

The mast carriage 46 is driven forwardly and rearwardly on the legs 38 by a pair of side cylinders 66 located within the square tubing of the side frame members 14. The rods 68 from cylinders 66 extend forwardly and connect to the rear of the mast carriage as best shown in FIGS. 6, 7, 9 by being connected to a collar 70 mounted on a vertically extending rod 72 fixed in a recess 74 in the rear of the mast carriage at each side of the mast carriage.

Figure 3:
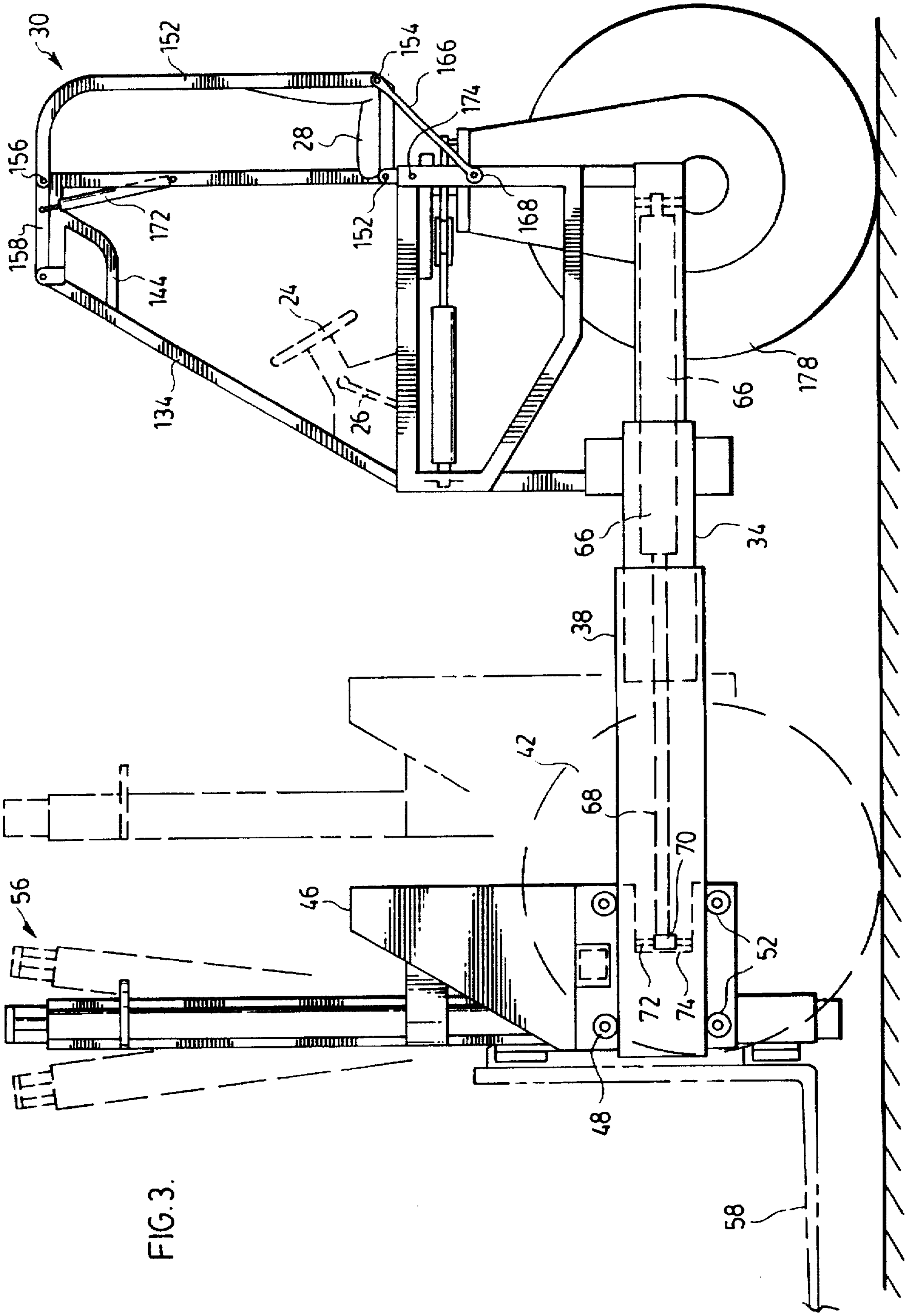
FIG. 3 is a side view of the forklift vehicle of FIG. 1, in extended (i.e. normal operating) condition.
Figure 12:
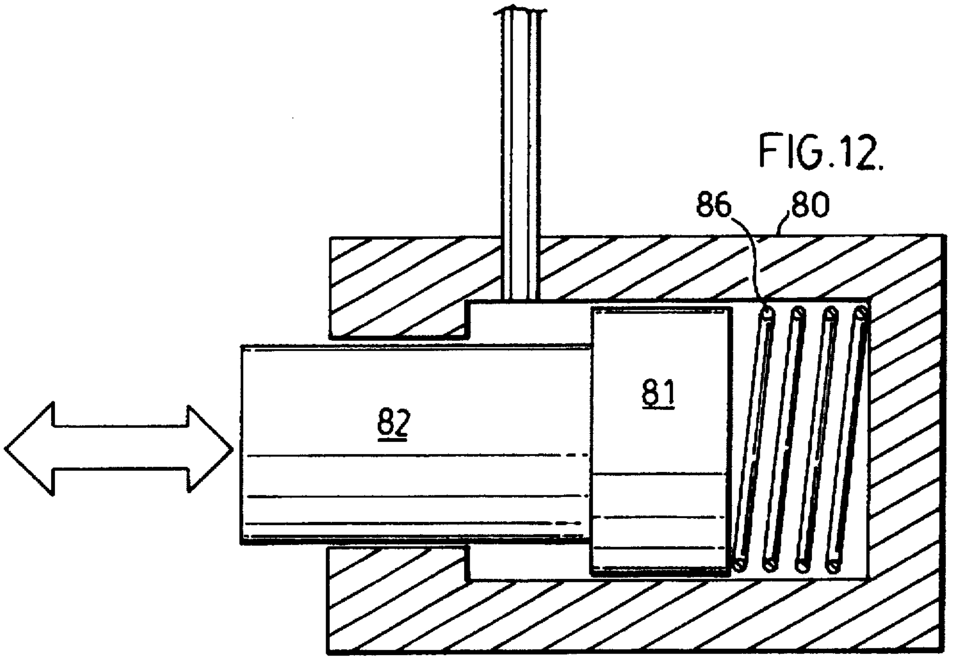
FIG. 12 is a side sectional view of another locking piston and pin for the FIG. 1 forklift vehicle.

When the forklift is being used in its normal operating mode, to lift and transport loads, the front legs 38 are locked to the slide plates 34 in the extended position shown in FIG. 3. The locking is performed by a piston and pin indicated at 78 in FIGS. 1, 2, 6, 7, 9 and 10 and shown in more detail in FIG. 12. The locking piston and pin 78 comprises (FIG. 12) a cylinder 80 located within each front leg 38, containing a piston 81 with a pin 82 projecting from the piston and normally extending into an opening 84 (FIG. 2) in each slide plate 34. The pin 82 is normally held securely in opening 84 by a spring 86 which biases the piston 80 outwardly into the locking position described. This ensures that the front legs 38 cannot move on the slide plates 34 unless such movement is desired.

Figure 4:
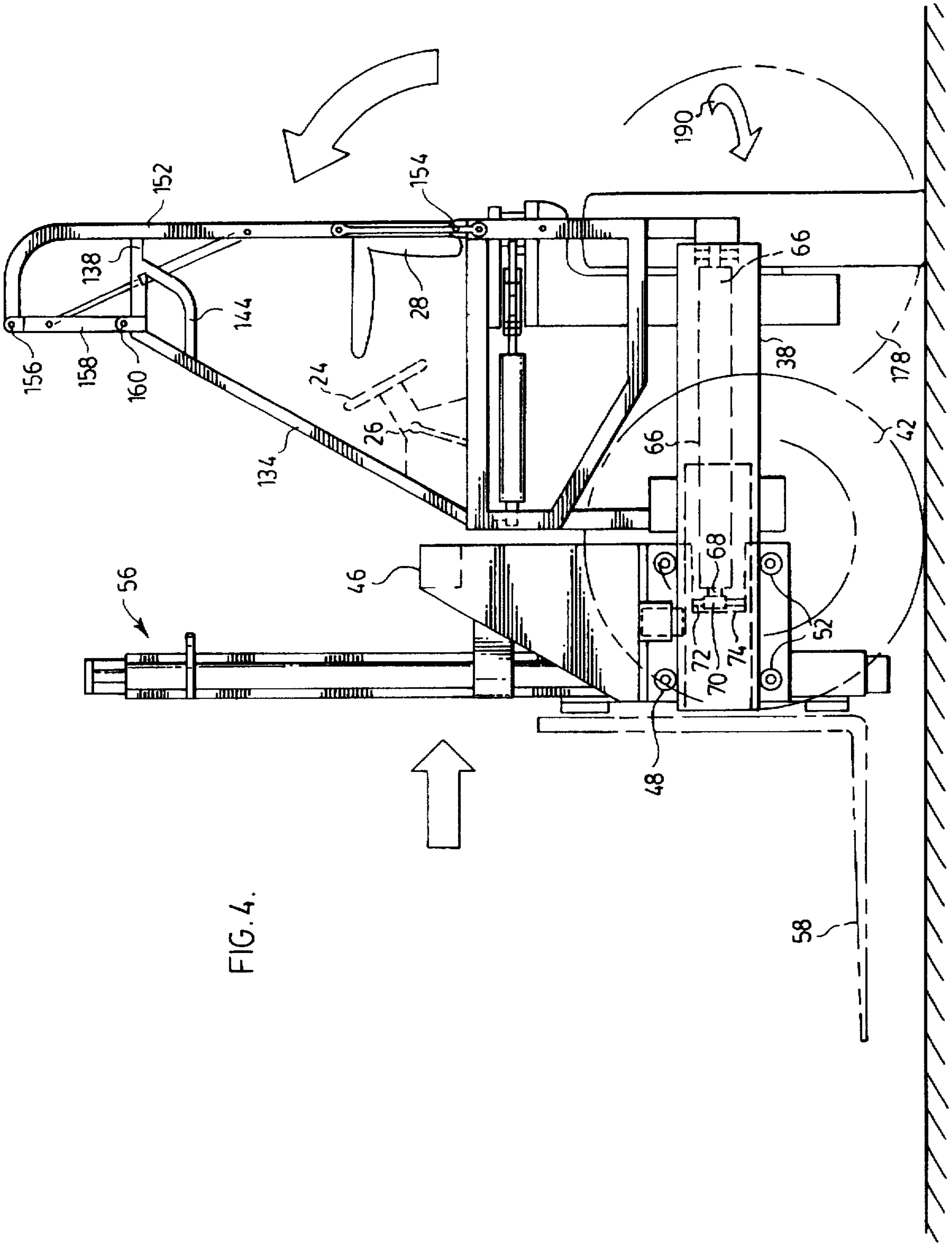
FIG. 4 is a side view of the forklift vehicle of FIG. 1 in collapsed condition.
Figure 11:
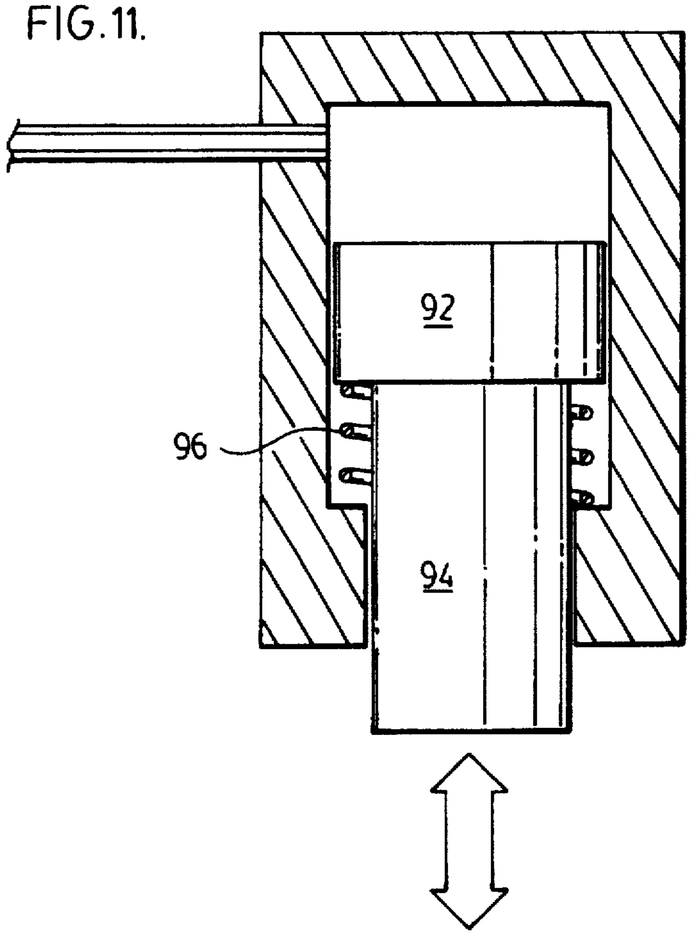
FIG. 11 is a sectional view of a locking piston and pin for the FIG. 1 forklift vehicle.

When the front legs 38 are to be retracted (as shown in FIGS. 1, 4) so that the length of the vehicle will be shortened so that it can be carried e.g. at the rear end of a transport truck, then the mast carriage 46 is moved by side cylinders 66 to its most forward position. As shown, the mast carriage 46 contains a pair of outwardly projecting plates 90, one on each outer side thereof, and each of which carries a further piston 92 and locking pin 94. As shown in FIG. 11, each piston and locking pin 92, 94 is normally biased by a spring 96 to a retracted position so that it does not interfere with forward and rearward movement of the mast carriage 46 along the front legs 38.

When the front legs 38 are to be retracted, the mast carriage 46 is as mentioned moved to its most forward position on the legs 38, so that the pins 94 are located over openings 98 in the upper surfaces of each leg 38, at the fronts of legs 38. The hydraulic control (levers 26) of the forklift vehicle are then operated to operate pistons 81, 92 simultaneously, to force the locking pins 94 from the mast carriage into the openings 98 in the legs 38, and also to withdraw the locking pins 82 which extend between the legs 38 and the slide plates 34. If desired, separate control buttons or levers can be provided to unlock the pins 82 from the slide plates 34 and to lock the pins 94 from the mast carriage into the legs 38, but preferably a single control button or lever 26*a* is provided to perform both operations simultaneously, as indicated schematically in FIG. 1A.

Once the mast carriage 46 has been locked to the legs 38 and the front legs 38 have been unlocked from slide plates 34, then the mast carriage 46 is retracted by side cylinders 66, carrying the front legs 38 with it, until the retracted or collapsed condition shown in FIGS. 1, 4 and 9 is achieved. There is no need to lock the legs 38 in retracted position for transport, since they are held in that position by the mast carriage cylinders 66.

If it is desired to extend the front legs 38 back to their normal operating position as shown for example in FIGS. 3, 6 and 7, then the procedure described is reversed. Specifically, the side cylinders 66 are extended, driving the mast carriage 46 forwardly and carrying the front legs 38 with it, until the extended position has been reached. The control button or lever 26*a* is then operated to release the hydraulic pressure locking pistons 81, 92. This allows the bias springs 86 to drive the pins 82 from the legs 38 into the openings 84 in slide plates 34, again locking the legs 38 to the slide plates. At the same time, the pins 94 carried by the mast carriage 46 are retracted by springs 96, unlocking the mast carriage 46 from the legs 38, so that the mast carriage 46 is again free to roll forwardly and rearwardly on the legs 38.

Figure 5:
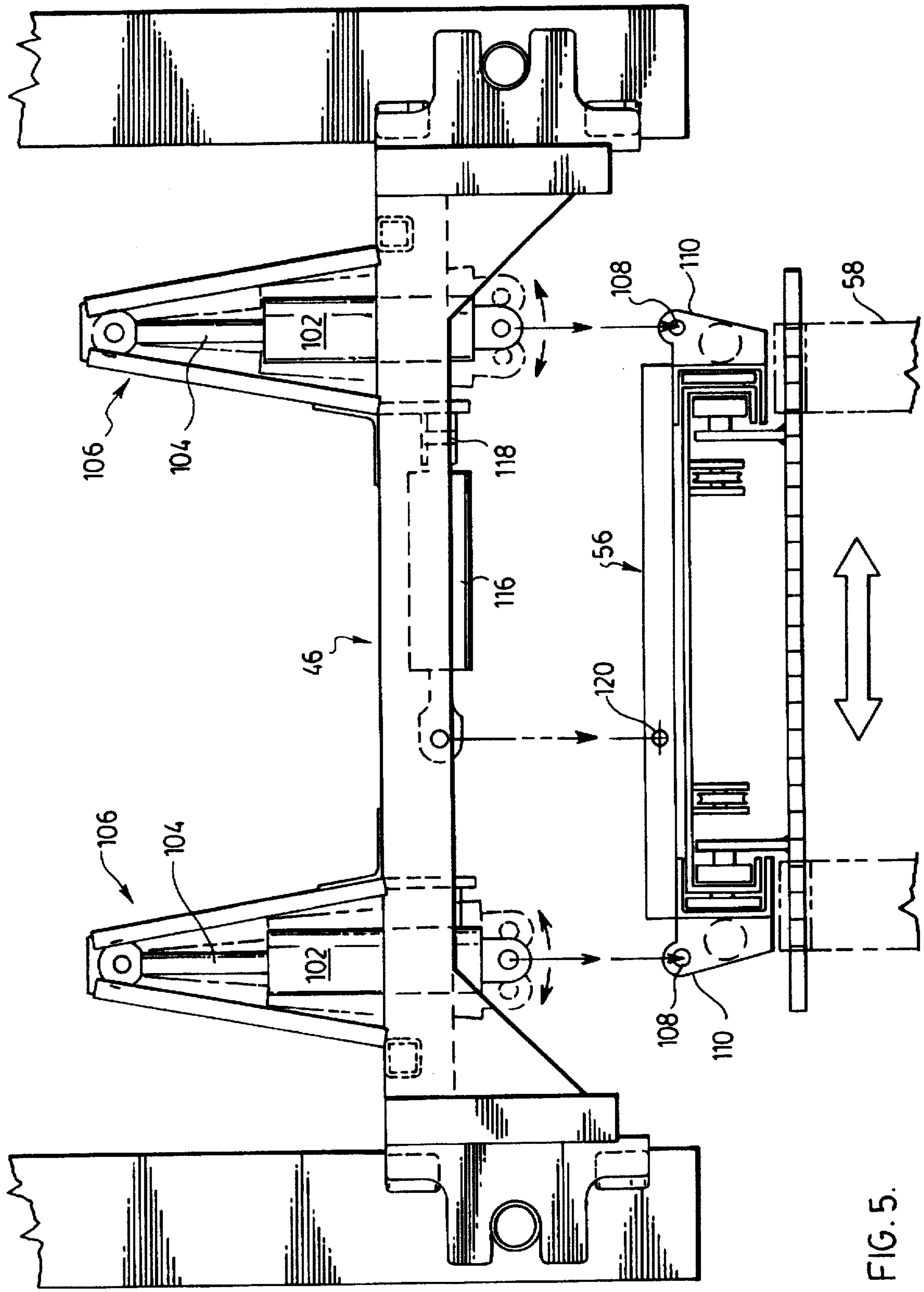
FIG. 5 is a top view showing mast carriage and mast component portions of the forklift vehicle of FIG. 1, in exploded relationship.

In the preferred embodiment described, the retraction or collapsing of the front legs 38 does not interfere with the mechanism provided for side shifting the mast 56 on the mast carriage 46, nor with tilting the mast 56 forwardly and rearwardly on the mast carriage 46. The forward and rearward tilt, illustrated functionally by arrows 100 in FIG. 7, is achieved by a pair of tilt cylinders 102 (FIGS. 2, 5) having their rods 104 pivotally connected to a pair of frames 106 which extend rearwardly horizontally from the rear surface at each side of the mast carriage 46. The front ends of the cylinders 102 are pivotally connected at 108 to tabs 110 extending at each side of the mast 56. The connection shown allows side to side movement of the mast 56 without affecting the connection of the tilt cylinders 102.

Figure 14:
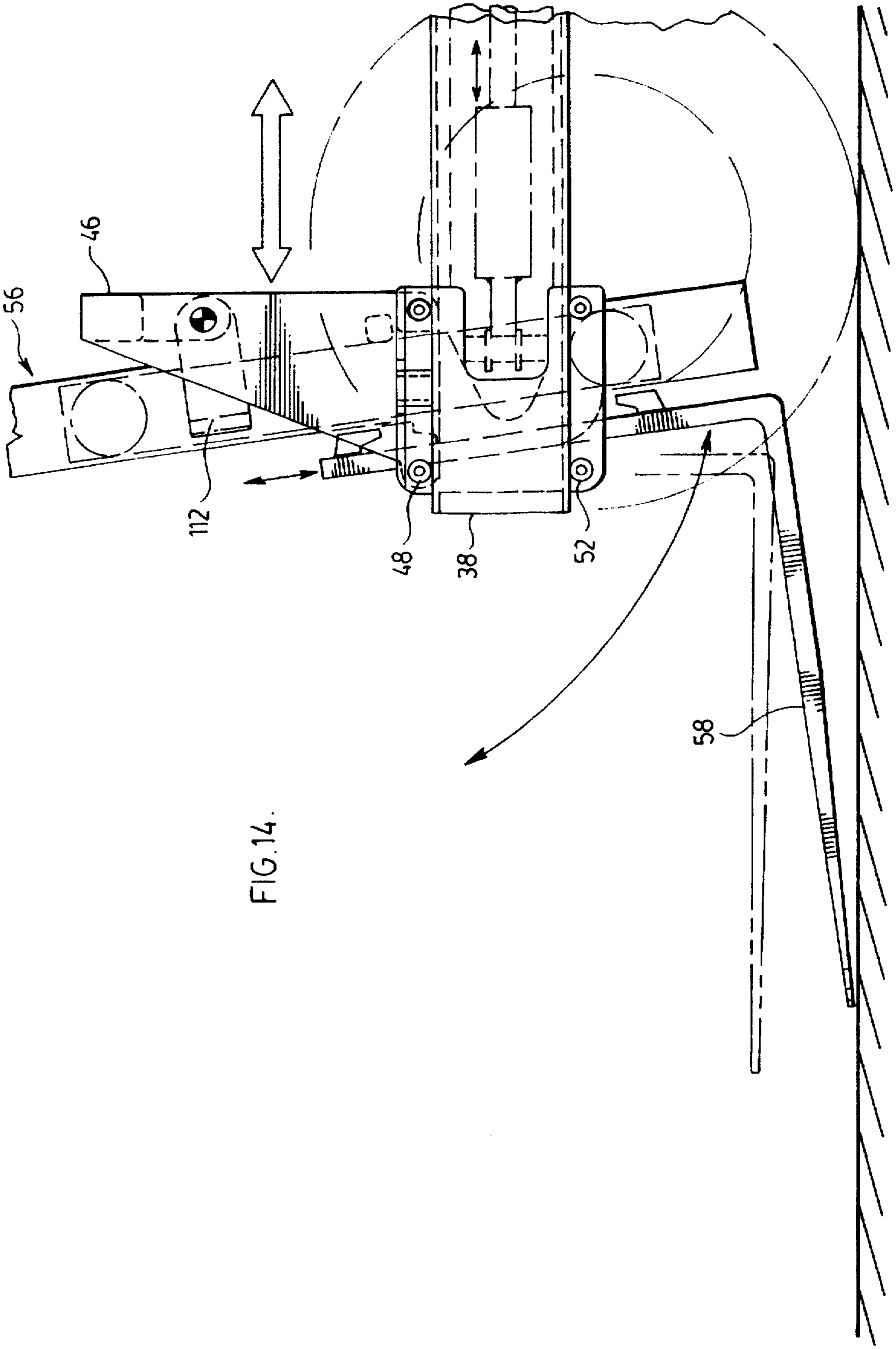
FIG. 14 is a side view showing details of the mast tilt arrangement for the forklift vehicle of FIG. 1.

At a location above the tilt cylinders 102, a pair of side arms 112 (FIGS. 1, 2, 14) extend outwardly and rearwardly from each side of the mast 56, to a pair of cross rods 114, one on each side of the mast carriage 46 near the top of the mast carriage. The arms 112 are pivotally connected to the cross rods 114. The cross rods 114 thus provide both a pivotal connection for the mast 56, allowing it to tilt about the rods 114, and a slide connection which allows the mast 56 to slide from side to side, so that it can be side shifted. A conventional side shift piston and cylinder 116 (FIG. 2) connected at 118 to the mast carriage 46 and connected at 120 (FIG. 5) to the mast 56 (both connections are pivotal as shown) effects side shifting of the mast when required.

It will be noted that when the mast carriage 46 is retracted, the rearwardly projecting tilt cylinder frames 106 (FIG. 5) project through openings 122 (FIG. 2) between the cross frame members 16*a*, 16*b*. This allows substantial retraction of the mast carriage 46 while still allowing the tilt cylinders 102 to project rearwardly from the mast carriage.

Although retraction of the legs 38 provides considerable shortening of the vehicle 10, in some cases such shortening may not be sufficient. Therefore, provision is made for providing additional shortening or collapsing of the vehicle in a lengthwise direction. This is achieved by constructing the operator cage 30 to have a front fixed portion 130, and a rear collapsible portion 132. The operator seat 28, which must be spaced by at least a minimum distance behind the steering wheel 24 and controls 26, is mounted in the collapsible portion 132.

The fixed portion 130 of the operator cage 30 has a pair of upwardly and rearwardly extending front struts 134, 136 which are mounted on subframe 20 front cross member 137. One front strut 134 is located at the side of the vehicle 10, while the other 136 is located adjacent the center of the vehicle. The central front strut 136 is connected at its top to a short rearwardly extending top member 138 which in turn is, integrally connected at its rear end to a downwardly extending strut 140. Strut 140 is welded at its bottom to the cross member 22 which is at the rear of the subframe 20. However no similar downwardly extending strut is provided for the side front strut 134, since a space must be left for the operator to enter and leave the protective cage 30. Instead, a looping bar 144 is provided at the top of side front strut 134, for the operator to grasp as he/she enters and leaves the machine. The portions just described constitute the fixed portion 130 of the operator protective cage 30.

The collapsible portion 132 of the operator protective cage 30 comprises a pair of rearwardly extending lower rear struts 148, one on each side of the operator seat 28. Struts 148 support the operator seat 28 by a plate 150 extending between and connected to the rear struts 148. The rear struts 148 are pivoted at 151 to the cross member 22 so that they can be swung upwardly from a horizontally rearwardly extending position and downwardly to that position.

An L-shaped member 152 is pivotally connected at 154 to the rear of each rear strut 148 and extends upwardly and then forwardly to a pivotal connection 156 with an intermediate member 158. Each intermediate member 158 extends forwardly and is pivotally connected at 160 to the top of one of the front struts 134, 136.

Figures 13, 13A:
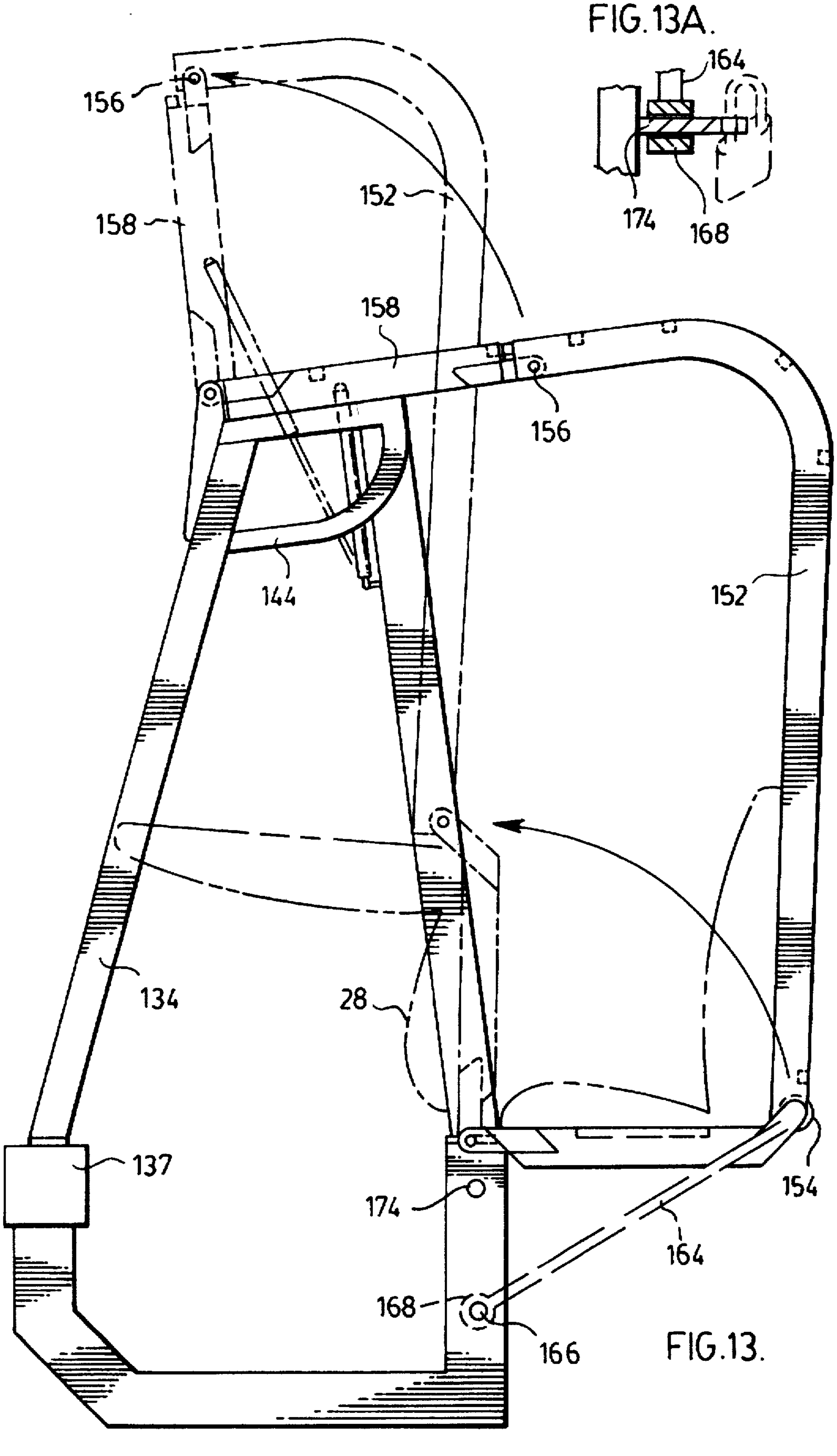
FIG. 13 is a side view showing an operator protective frame for the FIG. 1 forklift vehicle, in operating and collapsed condition.
FIG. 13A is a side view, partly in section, of a locking mechanism for the FIG. 1 vehicle.

The arrangement described is normally locked in the normal operating position shown in FIGS. 2 and 3 and in solid lines in FIG. 13 by a single side rod 164 which is pivotally connected at the junction of one rear strut 148 and its L-shaped member 152, and which extends downwardly and forwardly to a pin 166 extending outwardly from the subframe 20. The rod 164 contains a collar 168 which is normally pushed manually onto pin 166 to lock the cage in operating position. A locking device for rod 164, such as a cotter pin or the like, can be provided if desired.

When it is desired to collapse the operator protective cage, the bottom of rod 164 is pushed sideways to remove collar 168 from pin 166. Sufficient slack is provided at this connection to permit this operation.

Next, the collapsible portion 132 of operator protective cage 30 is pushed upwardly as indicated by arrow 170 in FIGS. 1A and 13, to raise the L-shaped members 152 to the position shown in dotted lines, in FIG. 13 and shown in solid lines in FIG. 4. This operation is assisted by a conventional gas strut 172 pivotally connected at each end between the vertical strut 140 and one of the intermediate members 158. When the collapsible portion 132 of the protective cage 30 is moved upwardly, it also moves forwardly so that the seat 28 assumes a vertical position and the length of the vehicle 10 is reduced, to facilitate transport of the vehicle. The collapsible portion 132 is locked in its collapsed position by any desired means, e.g. by providing a second pin 174 above pin 166 and over which the collar 168 of rod 166 can be placed. If desired, and as shown in FIG. 13A, pin 174 can have a diametrically extending hole 175 therein, located outwardly of collar 168 and through which a padlock or other lock 176 can be inserted. This locks the cage 30 in collapsed condition, in which the back of seat 28 touches or is very close to the steering wheel 24. This provides a simple way to render the vehicle 10 undrivable, essentially locking it even though it would otherwise be operable.

Figure 16:
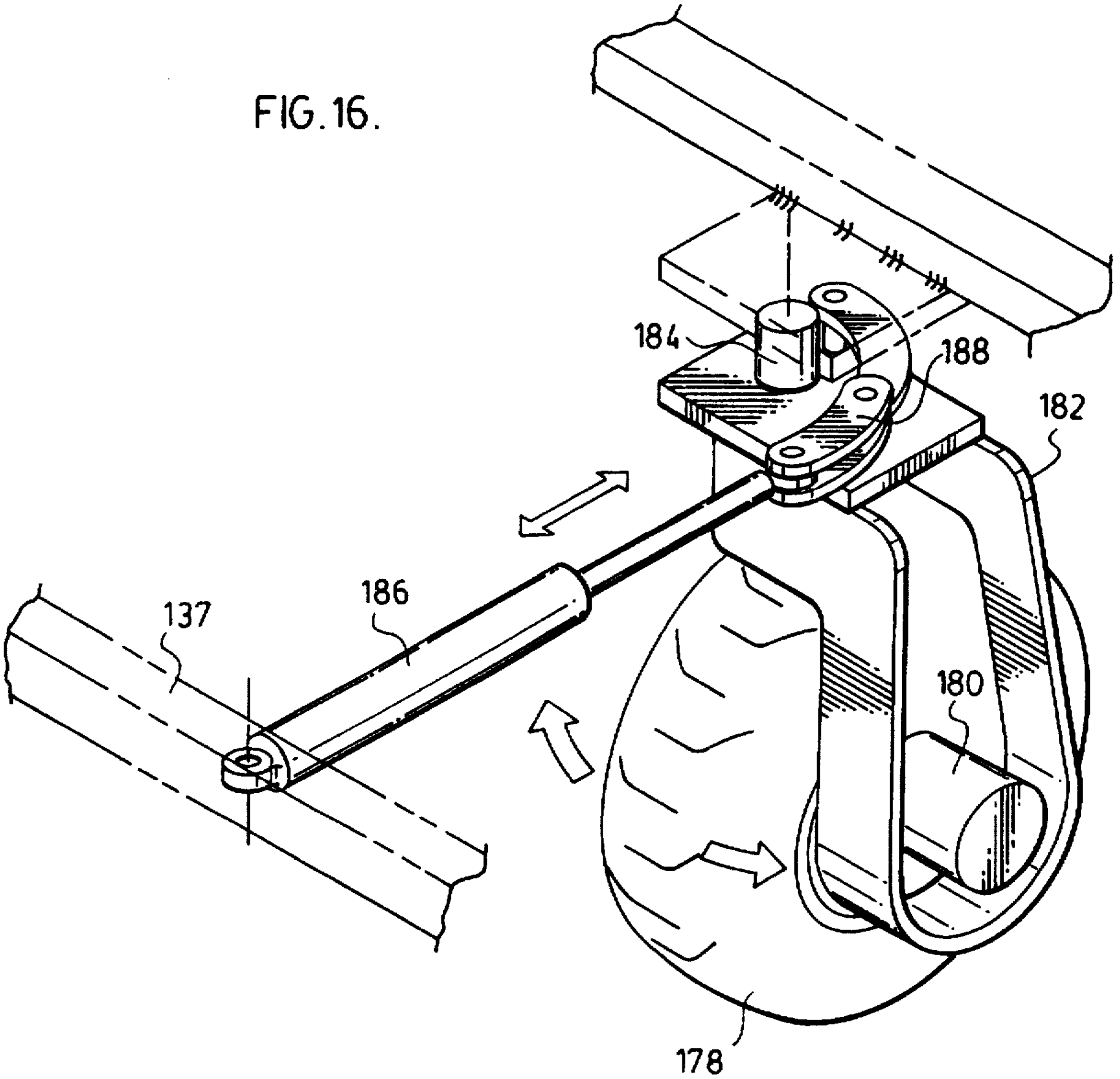
FIG. 16 is a perspective view showing the rear wheel steering mechanism for the FIG. 1 forklift vehicle.

When the protective cage 30 is collapsed as shown in FIG. 4, then the vehicle rear wheel 178 will be the most rearwardly extending portion of the vehicle. The rear wheel 178 is typically mounted and steered in conventional manner, as indicated in FIG. 16. As shown, the rear wheel 178 is driven by a hydraulic motor 180 and is supported by a frame 182 pivoted at 184 to the cross frame member 22. A piston and cylinder 186 mounted on upper subframe member 137 extends rearwardly to a pair of links 188 to steer rear wheel 178 in conventional manner. Thus, as indicated in FIG. 4, either before or after the operator protective cage 30 has been collapsed, the rear wheel 178 can be turned to a sideways position as indicated by arrow 190 (FIG. 4), further shortening the length of the vehicle.

Figure 17:
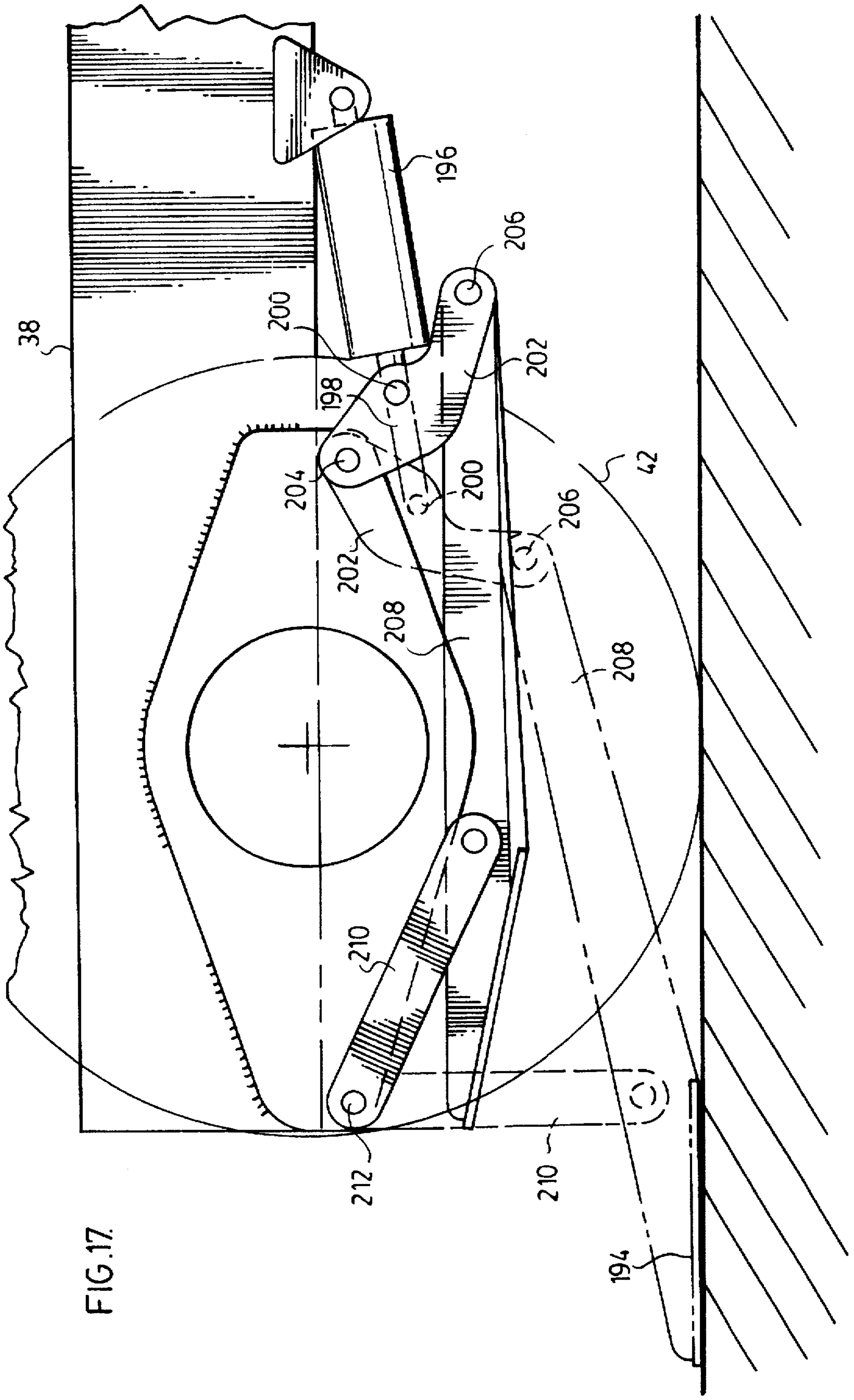
FIG. 17 is a side view showing the mechanism for lowering and raising an outrigger foot at a front wheel of the FIG. 1 forklift vehicle.

If desired, and as is common for forklifts, the vehicle may carry a pair of outrigger feet 194, best shown in FIGS. 2 and 17. Each outrigger foot 194 is operated by a piston and cylinder 196 connected to a leg 38, with the piston rod 198 pivotally connected at 200 to the center of a curved link 202. Each link 202 is in turn at one end pivotally connected at 204 to the leg 38 and at 206 (at its other end) to an arm 208 which carries the foot 194. A further link 210 is pivotally connected adjacent the front of each foot 194 and extends upwardly to a pivotal connection 212 with the front of the leg 38. Thus, when the piston rod 198 is extended, the foot 194 is forced to the downward position shown in dotted lines in FIG. 17, and when the piston rod 198 is retracted, the links 202, 210 carry the foot 194 to the upward position shown in FIG. 17.

Figure 18:
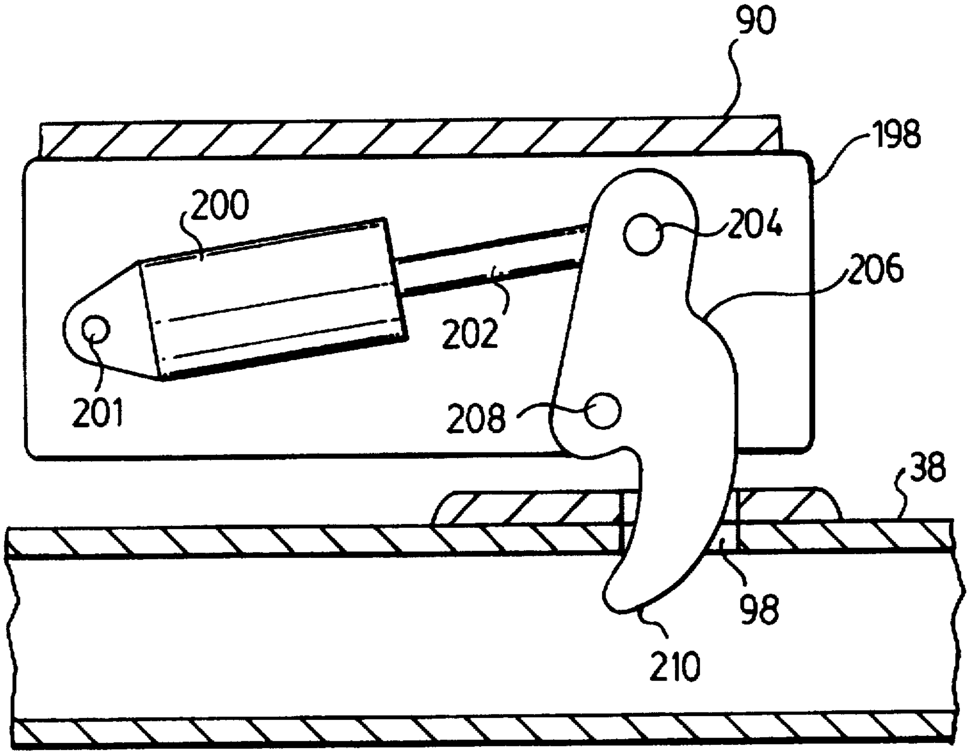
FIG. 18 is a side sectional view showing a modified locking mechanism.

While hydraulic piston operated locking pins have been shown, other locking mechanisms can be used if desired, to lock and unlock the legs 38 to the slide plates 34, and the mast carriage 46 to the legs 38. The locking mechanisms used can be hydraulic, mechanical or electrical. For example, as shown in FIG. 18, the mast carriage plates 90 can carry supports 198 on which pistons 200 are pivotally mounted at 201. Each piston rod 202 is pivotally connected at 204 to a latch 206 which is pivotally mounted at 208 on support 198 and which has a locking tip 210. When piston 200 is operated, latch 206 pivots about its pivotal mounting 208 to insert tip 210 into hole 98 in the top of leg 38 (to lock the mast carriage 46 to the leg 38), or to remove tip 210 from hole 98 (to unlock the mast carriage from the leg). A similar arrangement can be used to lock and unlock the leg 38 to slide plate 34. As before, button or lever 26a to control these two pistons preferably has two positions, one position in which the pistons are operated to lock leg 38 to slide plate 34 and to unlock mast carriage 46 from leg 38, and the other in which this situation is reversed.

It will be seen that in the preferred embodiment, the legs 38 retract essentially completely (as shown in FIG. 4) so that their rear ends are approximately at the rear ends of the side frame members 14, but the rear ends of legs 38 do not extend rearwardly beyond the rear of the frame members 14. In the fully retracted position the fronts of legs 38 are approximately flush with the fronts of slide plates 34. This makes it possible to shorten the length of the vehicle 10 to a very short length, e.g. 43 inches (excluding the forks 58). However even when the legs 38 are retracted, the vehicle 10 is still drivable (so long as cage 30 is in operating position), because in the preferred embodiment, the drive motor 31 is mounted transversely, so that even in retracted condition, the vehicle 10 is evenly balanced on its front and rear wheels and will not tip forwardly or rearwardly (when not loaded and driven slowly).

While a preferred embodiment of the invention has been described, it will be appreciated that various modifications can be made within the scope of the invention, and all such modifications are intended to be encompassed by the appended claims.

We claim:

1. A forklift vehicle comprising:

(a) a frame having a pair of sides, (b) a pair of leg support members extending forwardly one from each side of said frame, (c) a pair of legs, one mounted on each leg support member for movement forwardly and rearwardly on said leg support member, (d) a first pair of locking members, one mounted on one of each of said legs and said leg support members and operable between a locked position, in which each leg is locked to its support member, and an unlocked position in which each leg is free to move forwardly and rearwardly on its support member, (e) a mast carriage moveable forwardly and rearwardly on said legs, (f) an actuator for moving said mast carriage forwardly and rearwardly on said legs, (g) and a locking mechanism for locking said mast carriage to said legs when said mast carriage is in a forward position on said legs, so that said actuator can be operated to retract both said mast carriage and said legs, thereby shortening the length of said forklift vehicle.

2. A forklift vehicle according to claim 1 wherein said locking mechanism comprises a second pair of locking members mounted on one of said fork carriage and said legs and operable between an unlocked position in which said mast carriage is free to move forwardly and rearwardly on said legs and a locked position in which said mast carriage is locked to said legs.

3. A forklift vehicle according to claim 1 and including a first hydraulic actuating mechanism to drive each of said first pair of members from their locked to their unlocked position.

4. A forklift vehicle according to claim 3 and including spring means for biasing said first pair of members to their locked position.

5. A forklift vehicle according to claim 4 and including a second hydraulic actuating mechanism to drive each of a second pair of members from their unlocked to their locked position.

6. A forklift vehicle according to claim 5 and including spring means for biasing said second pair of members to their unlocked position.

7. A forklift vehicle according to claim 1 wherein said frame includes a cross member having openings therein, said vehicle including a fork mast pivotally mounted on said mast carriage, and a pair of pistons and cylinders extending rearwardly from said mast carriage and connected to said mast for tilting said mast, said pistons and cylinders extending through said openings when said carriage is moved rearwardly to a retracted position.

8. A forklift vehicle according to claim 1 wherein said legs each have rear ends, and wherein when said legs are in their most rearwardly position, said rear ends of said legs are located approximately at the rear of said frame but said legs do not extend rearwardly of said frame.

9. A forklift vehicle according to claim 8 wherein each leg is of box-tube construction having a side surface and upper and lower opposed channels on said side surface, and each leg support member is a slide plate sliding in said pair of channels.

10. A forklift vehicle according to claim 1 and further including an operator protective cage having a front fixed portion and a rear collapsible portion, an operator seat mounted on said rear collapsible portion, said rear collapsible portion being moveable between an operating position in which said seat is substantially horizontal and in which said collapsible portion extends rearwardly of said frame, and a collapsed position in which said seat is substantially vertical and said collapsible portion is moved upwardly and forwardly from said operating position.

11. A forklift vehicle according to claim 10 wherein said collapsible portion in said collapsed position does not extend rearwardly of said frame.

12. A forklift vehicle according to claim 11 wherein said collapsible portion comprises a pair of laterally spaced rearwardly extending members pivotally mounted for upward and forward movement with respect to said fixed portion of said operator protective cage, said seat being supported on said rearwardly extending members.

13. A forklift vehicle according to claim 12 and having a steering wheel, and wherein when said collapsible portion is in said collapsed position, said seat is folded forwardly to a position adjacent said steering wheel to hinder operation of said vehicle, and including a lock for locking said collapsible portion in said collapsed position.

* * * * *